Figure 1:
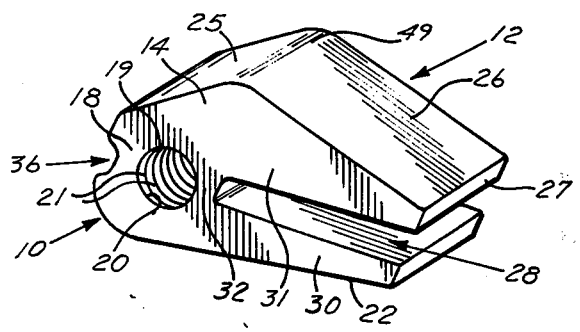

United States Patent [19]
Reed

[11] 3,878,758
[45] Apr. 22, 1975

[54] RELEASABLE FASTENER

[76] Inventor: Samuel M. Reed, 2121 Routt, Lakewood, Colo. 80215

[22] Filed: Aug. 24, 1973

[21] Appl. No.: 391,453

[52] U.S. Cl. ............................................. 85/32 R
[51] Int. Cl. ............................................. F16b 37/08
[58] Field of Search.......... 85/32 R, 33, 51, DIG. 2; 285/4, 3, 2

[56] References Cited
UNITED STATES PATENTS

| | | | |
|---|---|---|---|
| 414,519 | 11/1889 | Gladding | 85/32 R |
| 1,155,664 | 10/1915 | Lambert | 85/51 |
| 1,586,725 | 6/1926 | Westinghouse | 85/33 |
| 2,138,159 | 11/1938 | Hanks | 85/32 R |
| 2,162,171 | 6/1939 | Holmes | 85/32 R |
| 2,177,861 | 10/1939 | Burger | 85/51 |
| 2,537,776 | 1/1951 | Markl | 285/4 |
| 3,042,068 | 7/1962 | Smith | 85/33 |
| 3,054,145 | 9/1962 | Helpa | 85/DIG. 2 |
| 3,299,767 | 1/1967 | Royer | 85/32 R |

FOREIGN PATENTS OR APPLICATIONS

| | | | |
|---|---|---|---|
| 1,251,576 | 12/1960 | France | 85/33 |

*Primary Examiner*—Marion Parsons, Jr.

[57] ABSTRACT

A mechanical nut with a threaded hole designed to screw down onto a bolt or screw to fasten together apparatus has two integral extensions defining a deep slot therebetween into which an instrument can be inserted to apply a twisting or prying force against the extensions to break the nut into two halves, thus quickly releasing the bolt and the apparatus held. Particular uses for this nut are in situations in which it is desired to remove a nut "frozen" to a bolt, or when the only ready access to the nut and bolt is provided by a small opening into which an instrument may be introduced to apply a twisting force to break the nut.

10 Claims, 6 Drawing Figures

3,878,758

RELEASABLE FASTENER

This invention relates to releasable fasteners, and more particularly, to a quickly releasable nut for use with an associated screw or bolt.

For various reasons it is often difficult to remove a nut from a screw once it has been tightened and used for a time. The nut may freeze to the screw, preventing easy removal, due to corrosion caused by exposure to the elements or sustained heat. A nut may also be used in a location on a piece of apparatus in which, after the apparatus is fully assembled, the necessary access to unscrew the nut is lacking, requiring disassembly of other parts of the apparatus to get to the nut and bolt.

Nuts have previously been designed to facilitate their removal by forming a filed notch in the exterior of the nut so that a blow to the notch with a hammer and chisel at some later time will at least partially split the nut and simplify the release. However, this technique involves applying a sudden force to the screw and, after severing the nut, it is still necessary to turn the screw in the nut for complete disconnection.

It is, therefore, an object of the present invention to provide for a novel and improved releasable fastener which is readily detachable from a threaded male member to which it is connected.

It is another object of this invention to provide for a quickly releasable fastener which can be securely threaded into position on a threaded male member and in such a way as to prevent accidental loosening; yet, requires but minimal access to effect a quick and positive release without unthreading it from the male member.

A further object of the present invention is to provide a nut which can be secured on a threaded male member so as not to be subject to accidental turning as the male member is threaded or tightened in the nut without necessity of manually holding the nut against turning.

A still further object of this invention is to provide for an economical throw-away fastener which can be easily mass-produced; and further wherein the fastener is in the form of a threaded female member adapted to be threaded onto a bolt or other threaded male member and is provided with a deep slot into which a screwdriver or other implement may be inserted to pry the nut open and split it into two pieces.

In accordance with the present invention, a preferred form of releasable fastener comprises a threaded female member having external straight-sided portions to facilitate grasping by a wrench together with integral extensions projecting from one side which define a deep slot or notch therebetween into which a screwdriver or other implement may be inserted and twisted to split the nut into two pieces. The extensions in cooperation with the deep slot serve to form a selectively weakened area to permit breaking or expansion of the nut for the purpose of removal and in addition afford the further advantage of preventing the nut from turning once tightened in position on a bolt or other threaded male member. In the preferred form, the fastener is composed of a material which is capable of withstanding normal strains and forces when mounted in position on a screw, bolt or the like but is subject to breaking upon application of an opening force between the extension portions to permit ready removal from the male member.

Figure 2:
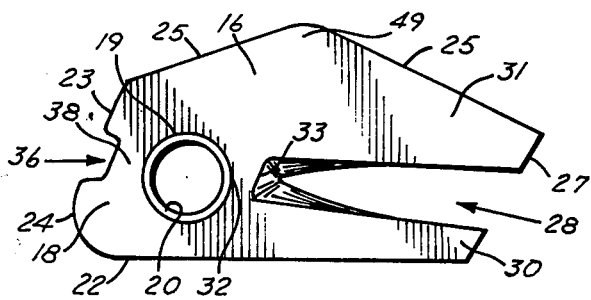
Figure 3:
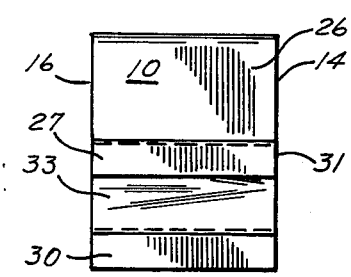
Figure 4:
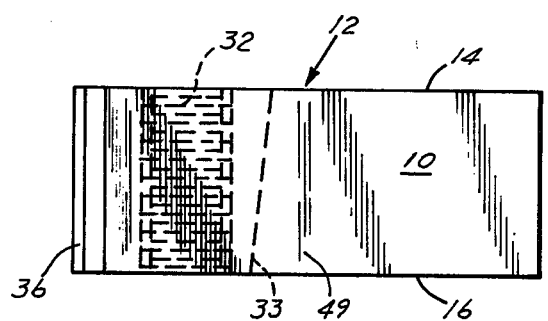
Figure 5:
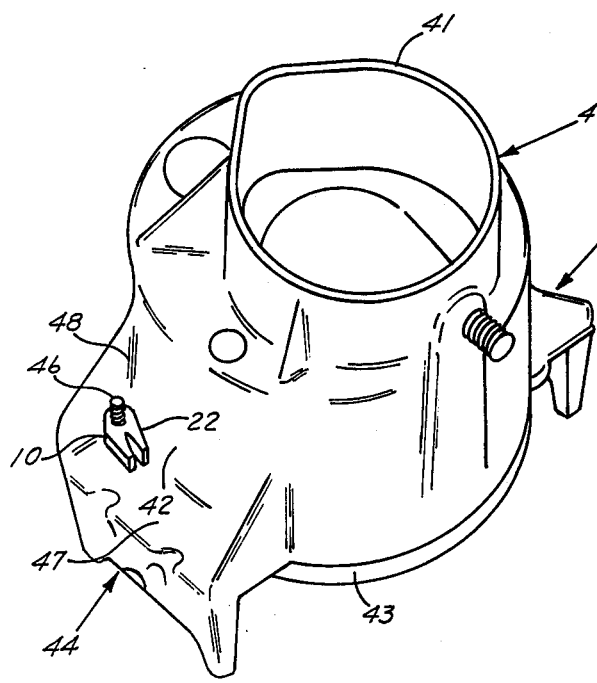
Figure 6:
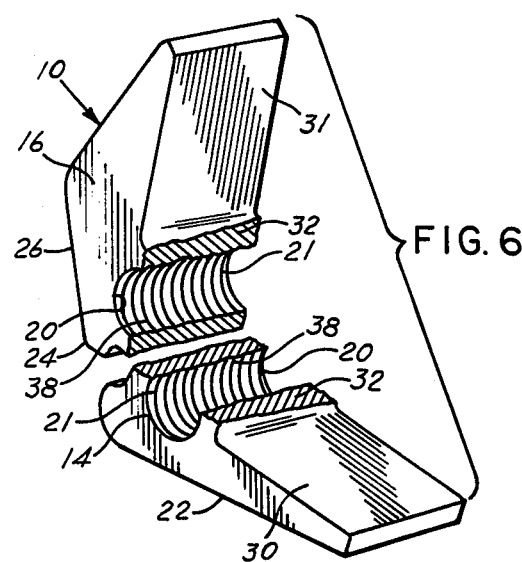

The above and other objects, advantages and features of the present invention will become more readily appreciated from the following detailed description of a preferred form of invention when taken together with the accompanying drawings, in which:

FIG. 1 is a perspective view of a preferred form of releasable fastener in accordance with the present invention, FIG. 2 is a top plan view of the releasable fastener of FIG. 1, FIG. 3 is an end view of the releasable fastener of FIG. 1, FIG. 4 is a side elevation view of the preferred form of releasable fastener, FIG. 5 is a perspective view depicting a typical application of a releasable fastener to a drive-in speaker installation, and FIG. 6 is a perspective view of the releasable fastener and the manner in which it is broken into halves when an opening force is applied thereto.

Referring in more detail to the drawings, there is illustrated in FIGS. 1 to 6 a preferred form of releasable fastener embodying the features of the present invention. In construction, the releasable fastener takes the form of a nut 10 having a generally elongated body 12 defining a flat top surface 14 and a substantially parallel bottom surface 16. The main body portion 18 of the nut has a bearing region 19 and a threaded opening or bore 20 eccentrically located therein extending therethrough in perpendicular relation to the top and bottom surfaces 14 and 16, respectively. As shown, the opening 20 is threaded as at 21 for threaded engagement with a similarly threaded male member, such as a bolt, screw or like male member 46 as shown in FIG. 5.

Referring in particular to FIGS. 1 and 2, the external sides of the nut surrounding the central body portion 18 include an elongated straight side 22, a shorter side 23 which is formed at an acute angle to the side 22 and joined thereto by the rounded portion 24; another shorter straight side 25 diverges away from the side 23 at an obtuse angle, and a convergent straight side 26 also forms an obtuse angle with the side 25. Finally, a straight side 27 extends at an angle between the straight sides 22 and 26 along the end of the nut opposite to the shorter side 23. While the particular angles formed between the sides are not critical, it will be noted that different V-shaped angles are formed, respectively, between sides 22 and 23, sides 23 and 25, sides 25 and 26, as well as the side 27 both with respect to the elongated side 22 and the straight side 26. In a manner to be later described, formation of the sides of the nut will greatly facilitate placement in limited areas where the sides can be wedged against surrounding walls to prevent the nut from turning when a threaded male member is inserted therein.

An additional feature of the nut resides in the formation of a deep notch or open slot 28 between the sides 22 and 26 and in a direction radially of the center line of the opening 20. The notch formed serves to divide the thickness of the nut into two extensions or ears 30 and 31, with the notch extending radially to a depth leaving a marginal thickness as designated at 32 between the outer dimension of the threading 21 and the inner edge 33 of the notch 28. Further, as best seen from FIG. 4, the inner edge 33 of the notch 28 angles or slopes away from the vertical so that the area of reduced or marginal radial thickness 32 increases from a minimum thickness at the bottom of the nut to a slightly greater thickness at the top and thereby forms a weakened area of separation which will cause progressive tearing or rupturing of the nut under the opening force applied thereto starting at the point of least thickness. In addition, a relatively shallow notch or recess 36 is formed vertically in a straight side 23 and a location substantially diametrically opposite to the notch 28 leaving an area of reduced radial thickness 38 directly opposite to the area 32. Between the areas 32 and 38 the bearing area 19 surrounding the opening 20 is of greater thickness. Specifically, the notch 28 is dimensioned to receive an implement such as the tip end of a screwdriver; and when a screwdriver is inserted therein and twisted or pried, the thickness of the area 32 is such as to initiate separation or rupture of the nut at that point. The notch or recess 36 will aid in the separation in that it will more readily permit bending and eventual separation along the area of marginal thickness 38. Most desirably, the notch 28 is also tapered inwardly toward the opening 20 so as to form extensions of progressively increased thickness whereby to minimize to the extent of substantially eliminating any possibility that the screwdriver or other implement would accidentally break off one of the extensions before the applied force is sufficient to separate the nut at its marginal thickness areas 32 and 38.

In composition, the preferred form of releasable fastener 10 may be composed of a relatively soft material such as aluminum or plastic which will exhibit the characteristics of withstanding normal strains or forces applied to the bearing region 19 when positioned on a bolt or screw; however, in response to a selectively applied force when a screwdriver is inserted into the slot 28 and twisted will break across the weakened areas of separation formed by areas 32 and 38 to permit ready removal of the nut from its male member.

In a typical application, FIG. 5 displays the nut 10 of the present invention in use on an outdoor drive-in speaker junction head 40. This is merely one example for which this invention has particular value. The junction head or casing 40 is shown in an inverted position to display the nut 10. The casing 40 forms a part of a speaker installation which is stationed between two adjacent parking spaces in a drive-in theater to provide a speaker to each of the two cars. The junction head 40 is mounted on top of a post (not shown) by its circular collar 41. The hollow of the casing is defined by a cylindrical outer wall 42 and upper cover 43 and contains the necessary wiring (not shown) to the two speakers (not shown). The speakers are connected to the junction box by long cables (not shown) which enable the speakers to be placed inside the car for listening to a movie, or to be hung on hooks 44 and 45 on either side of and integral with the junction head 40 when not in use. Note that when the box is in its right-side-up position, the hooks 44 and 45 will project upwardly to create places to hang the speakers. A bolt 46 extends through the cover 43 and the base 47 of one hook 44 and is screwed into the nut 10 to fasten the cover to the rest of the unit. The straight side 22 of the nut is nearly flush with the circular wall 42 and the rounded portion 24 of the nut facilitates placement of the nut 10 in a rounded corner 48 of the junction head 40. The elongated nut 10 contacts the wall 42 along its side 22 to prevent the nut from turning when the bolt 46 is screwed into it during assembly. Thus, after the bolt is started into the nut, there is no need to hold the nut while tightening the bolt.

The constant exposure to the weather of such apparatus tends to "freeze" or fix the nut and the associated bolt together so that separation of the two is difficult. Freezing can be caused by corrosion of the nut or bolt or both, by adhesion between the two due to deposit of a foreign substance onto the nut and bolt, or in some cases, by cohesive forces developed by tight contact between nut and bolt fusing the two together. Overtightening may cause binding of the threads and also freeze the connection.

The pressure of the bolt on the nut is directed downwardly through the opening 20 and evenly spread throughout the bearing region 19 by application of pressure on the total lengths of the threads 21 and very little stress is placed on the areas of reduced radial thickness 32 and 38 during the use of the nut. In order to remove the nut 10, a screwdriver or other blunt instrument (not shown) is inserted into the slot 28, and either through twisting the blade or prying with lateral force on the handle of the instrument, the nut can be easily broken into two parts at the reduced areas 32 and 38 as shown in FIG. 6. The narrow cross-sections of areas 32 and 38, best shown in FIG. 6, make them easily susceptible to twisting or prying forces within the slot, either of which tends to widen the slot and snap the first reduced thickness area 32 followed by the second reduced thickness area 38 as the slot is further widened. No damage need be inflicted on the bolt 46 or the casing 40, and the bolt 46 is immediately freed. To reassemble the apparatus, a new nut must be used with the old bolt 46.

In the embodiment shown, one extension 31 has a tapered cross-section in its side elevation shown in FIG. 2 so as to give it a thickened region 49 for maximum strength near the bearing region 22; and tapering toward the straight side 27 avoids the unnecessary use of metal. This assures that, when force is applied in the slot to break the nut, the ear 31 won't be broken before splitting the two break areas 32 and 38. The other extension 30 does not require reinforcement in the use shown in FIG. 5, since it is reinforced by its contact with the outer wall 48. For use in a position away from the wall, to reinforce the nut, it may be advisable that both extensions have the tapered cross-section of the one extension 31 for reinforcement.

Particular placement of the nut in the corner 48 formed between the side walls of the junction head 40 illustrates the advantages of the unevenly shaped sides of the nut which greatly facilitates mounting of the nut and threading onto a fastener without positively holding the fastener against turning. Of course, its ready conformability and adaptation for other uses and particularly in limited areas where access is difficult will be readily apparent. Furthermore, it will be apparent that obvious variations may be resorted to in the particular number and angular configuration of the sides while achieving the desired objectives of the present invention.

It is therefore to be understood from the foregoing that while a preferred embodiment of the present invention has been set forth, various modifications and changes may be resorted to without departing from the spirit and scope of the present invention as defined by the appended claims.

What is claimed is:

1. A female connector adapted to cooperate with a male member in fastening at least two parts together, said female connector comprising:
    a body portion of generally polygonal configuration having external, straight-sided surface portions and an opening eccentrically located within the body extending in a direction parallel to the straight-sided surface portions so that the body portion defines a bearing region of increased thickness partially surrounding the opening,
    extension ears formed in the bearing region of increased thickness, said extension ears formed by an open slot extending radially inwardly from one of the side surface portions toward the opening and terminating in an inner end adjacent to the surrounding edge of the opening, and
    the body portion being of least thickness between the inner end of the open slot and the surrounding edge of the opening to define a weakened area of separation therebetween such that a prying force applied in the slot between the extension ears will cause separation therealong and circumferential expansion of said body portion away from connection to the male member.

2. A female connector according to claim 1 wherein one of said extension ears is of greater thickness than the other of said extension ears.

3. A female connector according to claim 1, said body portion provided with a shallow slot diametrically opposite to said open slot so as to define a second weakened area of separation cooperating with the first weakened area of separation in effecting complete separation of the body portion into two halves when subjected to the prying force within the slot.

4. A female connector according to claim 1, wherein the external straight-sided surface portions are formed with different included angles therebetween.

5. A female connector in accordance with claim 1 wherein the sides of said extension ears which form said open slot are arranged in convergent relation to one another, whereby separation can be effected by introducing a tapered instrument into said slot perpendicular to said bearing region.

6. A releasable nut adapted to cooperate with a threaded male member in fastening at least two parts together comprising:
    a body portion of generally polygonal configuration having external straight-sided surface portions and a threaded bore extending through said body portion in a direction parallel to the straight-sided portion, said body portion forming a bearing region at least partially surrounding the threaded bore, and
    an open slot extending radially inwardly through the bearing region toward the center of the threaded bore and having an inner terminal end inclined with respect to the threaded surrounding edge of the bore to define a weakened area of separation between the inner extremity of the slot and the threaded bore, said slot being dimensioned to receive a prying element to effect a prying force within said slot effecting separation of the nut and circumferential expansion of the nut with respect to the threaded male member.

7. A female connector according to claim 6, said body portion provided with a second slot diametrically opposite to the open slot and cooperating with the open slot to effect complete separation of the nut into two halves when subjected to a prying force.

8. A female connector according to claim 6, said open slot having tapered sides converging radially inwardly toward the threaded bore whereby to form outwardly tapering extension ears on opposite sides of the open slot.

9. A female connector according to claim 8 wherein said bore is eccentrically located relative to said body portion bearing region, the external straight-sided surface portions on opposite sides of the bearing region tapering in a direction substantially radially outwardly from the eccentric bore to define tapered external sides of the extension ears.

10. A female connector according to claim 9, said open slot being dimensioned to receive a screwdriver blade which can be wedged into the open slot to effect separation along the weakened area of separation between the slot and the eccentric bore.

* * * * *